US011677923B1

(12) United States Patent
Thurston, III et al.

(10) Patent No.: US 11,677,923 B1
(45) Date of Patent: Jun. 13, 2023

(54) METHOD FOR IMAGE PROCESSING OF IMAGE DATA FOR HIGH-RESOLUTION IMAGES ON A TWO-DIMENSIONAL DISPLAY WALL

(71) Applicant: Unity Technologies SF, San Francisco, CA (US)

(72) Inventors: Kimball D. Thurston, III, Wellington (NZ); Peter M. Hillman, Wellington (NZ); Joseph W. Marks, Boston, MA (US); Luca Fascione, Wellington (NZ); Millicent Lillian Maier, Wellington (NZ); Kenneth Gimpelson, Wellington (NZ); Dejan Momcilovic, Wellington (NZ); Keith F. Miller, Wellington (NZ)

(73) Assignee: Unity Technologies SF, San Francisco, CA (US)

( * ) Notice: Subject to any disclaimer, the term of this patent is extended or adjusted under 35 U.S.C. 154(b) by 0 days.

(21) Appl. No.: 17/548,103

(22) Filed: Dec. 10, 2021

Related U.S. Application Data

(60) Provisional application No. 63/288,108, filed on Dec. 10, 2021.

(51) Int. Cl.
*H04N 13/133* (2018.01)
*H04N 13/15* (2018.01)
*G06F 3/14* (2006.01)
*H04N 13/204* (2018.01)
*H04N 13/189* (2018.01)

(52) U.S. Cl.
CPC ......... *H04N 13/133* (2018.05); *G06F 3/1446* (2013.01); *H04N 13/15* (2018.05); *H04N 13/189* (2018.05); *H04N 13/204* (2018.05)

(58) Field of Classification Search
CPC .... H04N 13/133; H04N 13/15; H04N 13/189; H04N 13/204; G06F 3/1446
USPC .......................................................... 348/42
See application file for complete search history.

(56) References Cited

U.S. PATENT DOCUMENTS

| | | | |
|---|---|---|---|
| 7,523,411 B2 | 4/2009 | Carlin | |
| 2013/0091519 A1 | 4/2013 | McLauchlan et al. | |
| 2014/0306995 A1* | 10/2014 | Raheman | A63F 13/42 345/633 |
| 2018/0262698 A1* | 9/2018 | Scharer, III | H04N 5/2256 |
| 2019/0358547 A1* | 11/2019 | Mack | H04N 21/2187 |
| 2021/0272351 A1* | 9/2021 | Thurston, III | G11B 27/031 |
| 2021/0374391 A1 | 12/2021 | Jorasch et al. | |

* cited by examiner

*Primary Examiner* — Tung T Vo
(74) *Attorney, Agent, or Firm* — Haynes and Boone, LLP

(57) ABSTRACT

A captured scene captured of a live action scene while a display wall is positioned to be part of the live action scene may be processed. To perform the processing, image data of the live action scene having a live actor and the display wall displaying a first rendering of a precursor image is received. Further, precursor metadata for the precursor image displayed on the display wall and display wall metadata for the display wall is determined. An image matte is accessed, where the image matte indicates a first portion associated with the live actor and a second portion associated with the precursor image on the display wall in the live action scene. Pixel display values for a replacement wall image of higher resolution than the precursor image is determined, and the image data of the captured scene is adjusted using the pixel display values and the image matte.

20 Claims, 6 Drawing Sheets

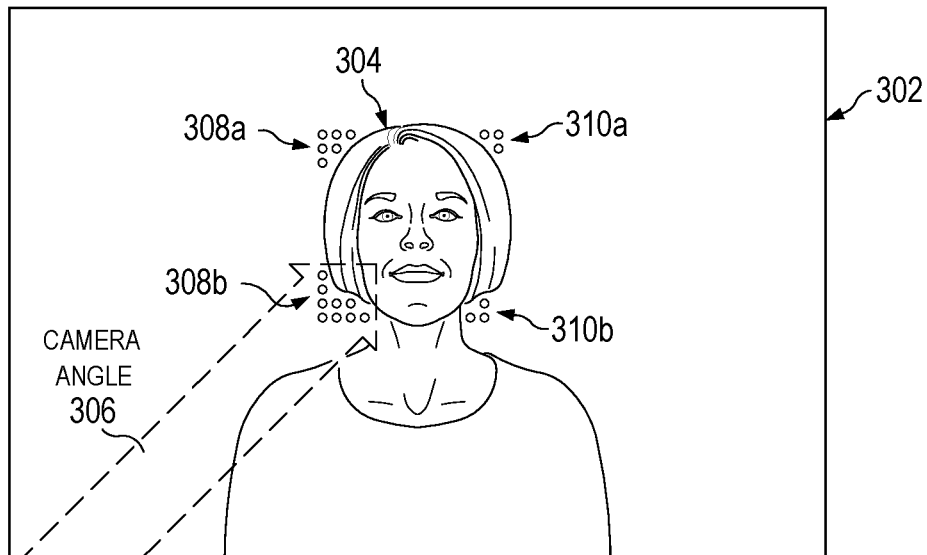
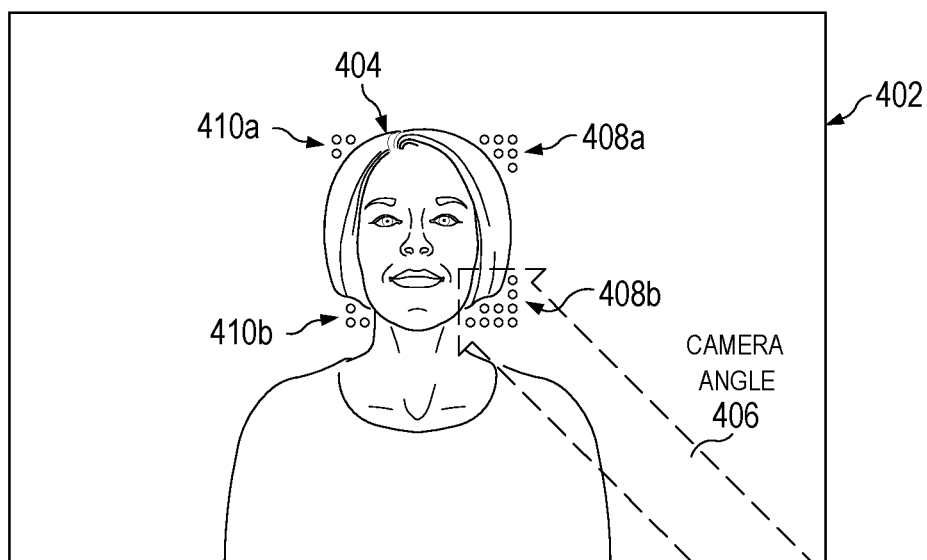

METHOD FOR IMAGE PROCESSING OF IMAGE DATA FOR HIGH-RESOLUTION IMAGES ON A TWO-DIMENSIONAL DISPLAY WALL

CROSS-REFERENCE TO RELATED APPLICATION

This application claims priority to and the benefit of U.S. Provisional Patent Application No. 63/288,108, filed on Dec. 10, 2021, the contents of which are hereby incorporated by reference in their entirety.

FIELD

The present disclosure generally relates to computer image processing for image data, including stereoscopic image data captured by two or more cameras, and more particularly to processing image data having a two-dimensional (2D) display wall with one or more three-dimensional (3D) objects placed relative to the 2D display wall.

BACKGROUND

In computer-generated image generation and animation, of images and/or video sequences, there might be a desire to incorporate a digital wall while capturing a live action scene of an actor. In a detailed live action scene that incorporates background animated elements, it could be difficult to properly coordinate a live actor with those background elements. Furthermore, if it is desirable to project lights, colors, or other real-world effects on a live actor, it may be tedious to ensure that those effects are properly aligned between the live actor and the animated background imagery that is later added to a scene. Animated objects that may be placed in a background scene and/or with a live action scene can comprise many individual objects, which may have their own lighting effects, colors, and/or interactions with live actors. For example, a scene involving an explosion or other intense light may have features that cause colors to be projected onto live actors. Background scenes may also involve stage elements and/or creatures that interact with live actors, such as by acting as an environment and/or engaging with live actors.

For simple scenes and/or backgrounds, modeling or drawing individual background objects and/or scenes might not be difficult. However, as viewers have come to expect more complex visuals, there is a need for a procedural processing, rendering, and adjusting backgrounds to appear more realistic. Further, stereoscopic imaging may be used to capture scenes as they would be viewed from different angles, and therefore add depth and 3D elements to the captured images and video. When 2D elements are added to a display wall or other 2D object, the display wall may not appear realistic with 3D live actors when a live scene is stereoscopically captured. Thus, it may be desirable to adjust and/or re-render background imagery captured of a 2D wall in real-time and/or after capturing a live action scene in order to provide more realistic 3D visuals.

SUMMARY

According to some embodiments, a computer-implemented method for processing, in an image processing system, a captured scene captured of a live action scene while a display wall is positioned to be part of the live action scene, wherein the display wall comprises one or more structures capable of displaying imagery, the method may include receiving image data of the live action scene having a live actor and the display wall displaying a first rendering of a precursor image, wherein the image data is captured by at least one camera in at least one placement relative to the live actor and the display wall, determining precursor metadata for the precursor image displayed on the display wall and display wall metadata for the display wall, wherein the precursor metadata comprises pixel display data for display wall pixels of the display wall, and wherein the display wall metadata comprises geometry data for a display wall position relative to the at least one camera, accessing an image matte for the image data, wherein the image matte indicates a first portion associated with the live actor and a second portion associated with the precursor image on the display wall in the live action scene, determining pixel display values for a replacement wall image of a higher resolution than the precursor image, wherein the pixel display values comprise a frequency adjustment to background pixels of the display wall in the image data, and adjusting the image data of the captured scene using the pixel display values and the image matte, wherein adjusting the image data warps the background pixels to the replacement wall image in the image data.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the surface computation method, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which:

FIG. 3 illustrates an exemplary environment for a live action scene captured by a left oriented camera, in an embodiment.

FIG. 4 illustrates an exemplary environment for a live action scene captured by a right oriented camera, in an embodiment.

DETAILED DESCRIPTION

Figure 2:
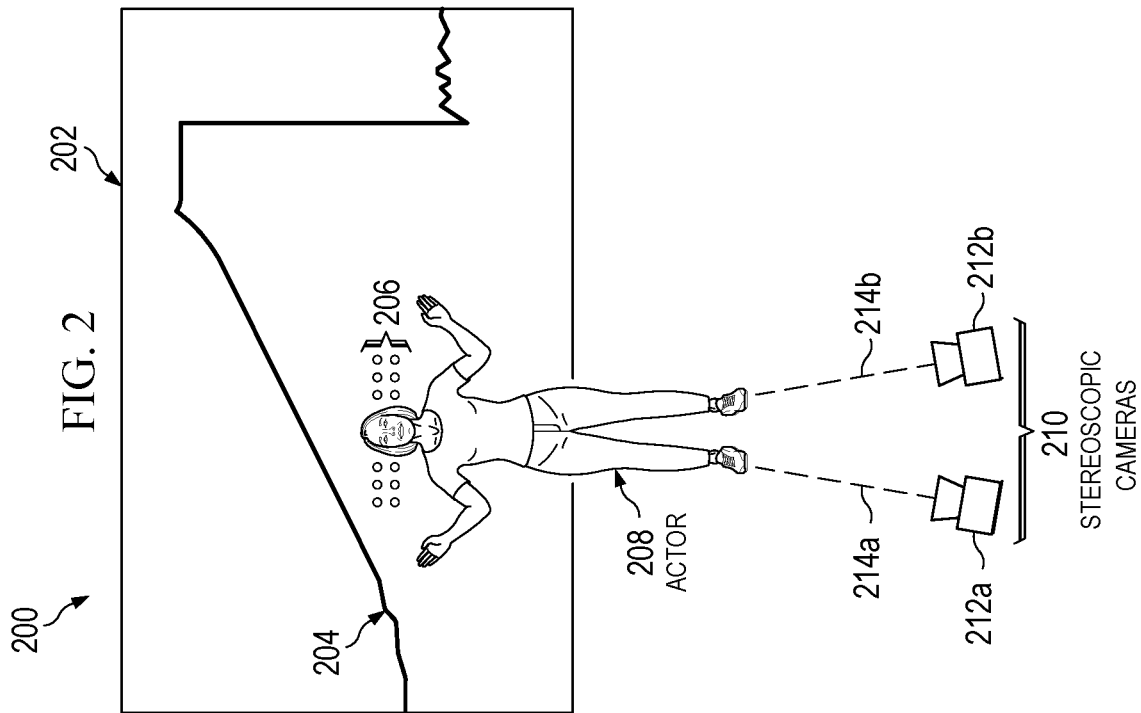
FIG. 2 illustrates an exemplary live action scene having stereoscopic cameras capturing a live actor in a 3D environment with a 2D display wall, in an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Computer simulation that is used with live actors may be placed into a live action scene in different ways. Conventionally, live actors may act in front of a green screen or other colored background that allows for chroma keying to provide visual effects in post-production and after a live action scene is captured. This may be used to provide different background effect, which allows for providing computer simulated effects, backgrounds, and the like with live actors. However, chroma key compositing may suffer from issues of realism when adding visual effects in post-production. For example, the green screen does not include any computer simulation and/or animation when the live actor is acting in the live action scene. Thus, the live actor may be required to pretend that certain animated portions of the scene are present. This may be an issue where those animated elements are interacted with by the live actor, such as an environmental object and/or character. A live actor may not know exactly where a cliff or edge may be when later added as animated elements or may not know the exact location of a character or creature that the live actor is engaging with in the live action scene. Further, the green screen used for chroma keying does not provide lighting or colors, which may be projected onto the live actor (e.g., in the case of an explosion or the like) or may be reflected in the live actors' eyes, glasses, wardrobe pieces, or the like.

In this regard, a display wall may be used, which may include a display screen (e.g., an LED, LCD, LED LCD, OLED, or the like) that is capable of outputting a rendering of an image or a video. The rendering may correspond to a precursor image, which may be an image from a renderer or a compositor. This image may be entirely or partially computer generated and/or animated, may be captured earlier from a live action scene, or a combination thereof. The precursor image may be a single image displayed on the display wall or may be a sequence of images, such as frames of a video or animation. The precursor image may include precursor metadata for computer generated imagery and/or pixel display data for pixels of the display wall. In this regard, the precursor metadata may include output pixels, data, color, intensity, and the like for outputting the image on the display wall.

The display wall may correspond to one or more structures that are then positioned in the real-world live action scene, and may be planar, curved, or the like. In this regard, the display wall may serve as a background, however, this may not be the only orientation and the display wall may also be placed above, next to, or otherwise oriented with regard to a live actor. The display wall may be placed relative to a scene or stage element, such as a live actor or other object in the 3D real-world scene for the live action. The live actor then acts and interacts with the live action scene corresponding to the real-world environment that is being captured by one or more cameras. The live action scene may also be captured by other sensors and/or sensing devices, including optical sensing devices, depth sensors and/or ranging sensors (e.g., LiDAR), and the like.

When the live actor interacts with and/or performs in the live action scene, the display wall may output one or more precursor images that may be used with the live actor to capture image data. This image data may be captured by one or more or more cameras. For example, a camera may be oriented relative to the 2D display wall to capture background imagery and pixels of the 2D display wall while stage elements are present in a live action scene in front of and/or relative to the 2D display wall. In some embodiments, the image data may be stereoscopically captured by two or more cameras may be placed proximate to each other in different locations so that the cameras may capture different angles of the live action scene. In some embodiments, the cameras may be oriented so as to mimic how a person or creature may view the live action scene, such as how a human that would view the live action scene. This may be used to provide additional realism to capturing the live action scene and/or capture the live action scene in 3D so that the image data may later be rendered and output in 3D when viewed by an audience.

However, when using a 2D display wall with a 3D live actor and/or 3D objects in front of the display wall, different capturing of the live action scene, live actor, 3D objects, and/or 2D display wall may cause different cameras to capture different versions of the live action scene. This may be caused when different cameras may capture different angles of the live action scene so that different parts and/or appearances of the display wall are captured behind the live actor or other 3D objects. The actor and/or objects in front of the display wall may block or obstruct certain pixels of the display wall based on different angles, while capturing different pixels from different angles. Thus, the live action scene may be captured using one or more cameras and/or other sensors while the display wall is present in the scene and outputting one or more precursor images or other precursor imagery.

The live actor may be engaging with the display wall and/or other elements and objects in the live action scene while computer generated imagery is being generated by a renderer and displayed on the display wall. The display wall may also emit or output light, colors, and the like that are projected on and/or reflected by the live actor or other objects in the live action scene. An image processor may, in real-time, near real-time, or at a later post-processing time, determine which portions of the captured image data correspond to the live actor, and which portions correspond to the display wall (e.g., background or display wall pixels). The portions may correspond to individual pixels of the display wall and/or live actor in the image data and may be different between different image data captured by each camera. The image processor may then generate an image mat, which may be generated and/or stored as a pixel array where values or data for pixels in the pixel array indicate whether the corresponding pixel is part of the display wall or another foreground actor, object, or the like in the live action scene.

The image matte may then be used to selectively modify pixels in the precursor metadata for the displayed precursor image to change the output or rendering of those pixels when displayed on the display wall and/or captured in the stereoscopic image data. In some embodiments, the image matte may be a binary mat, a junk matte (e.g., where pixels are identified as part of the display wall, not part of the display wall, and/or uncertain as to whether those pixels belong to the display wall). For example, the image matte may be used to modify pixels that correspond to the display wall when a precursor image is being displayed on the display wall or at a later time when the stereoscopic image data is processed and background pixels are moved, warped, adjusted, and/or re-rendered. Thus, the image matte may correspond to an alpha channel image that may allow for modification, adjustment, and/or change of one or more portions of the stereoscopic image data (e.g., the live actor, the display wall, or another portion of the image data).

In this regard, the precursor metadata may include a scene description with information about the 3D position of a computer-generated objects, characters, or the like in the precursor image for the display wall. Modification of pixels corresponding to the display wall may include replacement of pixel color values and/or pixel outputs that correspond to the display wall to the pixel values that would have actually been captured if the precursor image on the display wall actually existed in the live action scene and real-world 3D environment. This may allow stereoscopic cameras to capture stereo image pairs of the live actor in front of the display wall but modified so that the captured image data appears as if the precursor image was actually present in 3D instead of 2D on the display wall. Thus, a renderer and/or compositor system may perform pixel replacement corresponding to the display wall, taking into account precursor metadata of the precursor image on the display wall, to present a processed precursor image on the display wall for a 3D image in a live action scene.

The image processor may generate the image matte using different techniques. For example, the image processor may determine the image matte by computing the image matte, from the precursor image metadata and/or display wall metadata (e.g., information for placement of the display wall, depths to 3D stage elements and/or cameras, lighting or effects in the real-world environment, etc.) with the image data based on what the camera should have captured, and what the camera actually captured. Pixel values that are the same or similar to what should have been captured in the region those pixels should be located may be identified as background pixels, while other pixels may correspond to a live actor or other 3D object in the live action scene. Further, the image processor may determine where the display wall is in a scene, such as a distance or depth from the cameras to the display wall, to identify those pixels that correspond to the display wall and those that correspond to a foreground object or live actor.

Once the image processor determines the image mat, the image processor may execute different processes with the image mat. For example, the image processor may move the background pixels to stereo-displaced locations and/or so that the pixels are now stereo-displaced pixels of the precursor image that appear as though the precursor image is in 3D when captured by stereoscopic cameras. This may include adjusting, moving, and/or warping pixels of the precursor image from a camera position and/or camera settings with the precursor metadata and/or display wall metadata. This may be based on the position of the actual camera and display wall at the time of capture and the adjustments or replacement pixels may be generated using the image matte to appear as a 3D image or imagery on the display wall. Depth may also be determined using one or more depth sensors for pixel identification and replacement. Further, this may account for different types of cameras capturing the scene, such as a "hero" camera for a main camera capturing the important or main elements of the live action scene (e.g., the live actor), as well as non-hero cameras.

Although the pixels are referred to as replacement pixels, the pixels may instead be data and/or metadata that cause changing, warping, adjusting, or moving original background pixels associated with the display wall instead of directly replacing such pixels. For example, adjusting pixels may include moving pixels within image data captured of the display wall in the live action scene and/or on the display wall directly. Movements may correspond to moving the pixels in one or more 2D or 3D directions for the display wall and/or live action scene, as well as computing other changes to positions and/or locations for pixels in image data. Adjusting pixels may also include warping or changing pixels, which may change pixel values or data (e.g., color, brightness, luminosity, effect, intensity, and/or the like) instead of or in addition to direct movement of the pixels. Thus, pixel adjustments may include changes to pixel values and data in image data instead of or in addition to direct replacement of pixels with another or different pixel.

For example, with stereoscopic image data captured by two or more cameras, pixels from each camera may not exactly match in the resulting image data. A left oriented camera may capture a different scene than a right orientated camera. These differences in the pixels captured of a display wall may be slight, such as where the two cameras are nearby in order to attempt to mimic eye placement of a character or creature viewing the live action scene having the live actor or other stage element and the display wall that is 2D in the live action scene. However, these differences in the pixels of the display wall may also be larger with different camera placements. In order to compensate for these differences and view a stereoscopic image on the 2D display wall, the pixels corresponding to the 2D display wall in one or more camera images and data from the two or more stereoscopic cameras may be moved and/or warped in the resulting image data. This may include moving background pixels for the display wall to compensate for one or more of the other cameras and/or warping those pixels to different placements in the resulting image data (e.g., the stereoscopic image data from multiple cameras). These placements for moving or warping pixels may be an average between each of the cameras or may be compensated to a larger degree to or away from one or more of the cameras. In some embodiments, the placements may be moved or warped to correspond directly to the image data from another camera, but other lesser placements may be determined between distance differences of the captured background pixels between the two or more cameras.

In further embodiments, the background pixels may be replaced to generate a higher resolution image on the display wall, such as if the cameras capture a lower resolution image based on distances to the display wall, visual effects, camera lenses or components, camera focus, and/or the like. The background pixels may be replaced in a fast manner in real-time or near real-time so that the precursor image may be captured with the live actor in the live action scene and may be used by the live actor when interacting and performing in the live action scene. This may be done in a first and/or lower quality so that the precursor image appears as a 3D image, and may later further be performed in a second, slower, and/or higher quality during post-processing of the precursor image on the display wall. The image matte may also be used to apply an image, real-world, and/or visual effect that is applied to the stereoscopic image data. This may be applied not to the captured light from the display wall but instead to the precursor metadata and substituted for the captured live action image of the display wall. This may include adjusting depths of the corresponding effect in order to provide changes to depths of the effect, distances of the effect, thickness or density of the effect, and the like. For example, different effects may include an environmental effect, a lighting effect, an elemental effect, a venue-based effect, a blurring effect, a focus effect, an increased resolution effect, or a color correction. Effects such as rain, snow, fog, or the like may be dependent on depth, as well as other visual effects from lighting and the like. In this manner, a more realistic and 3D imagery may be rendered on the display wall to automatically provide enhanced visual effects and better capture image data, while reducing user input, post-processing adjustments, and additional data processing.

Figure 1:
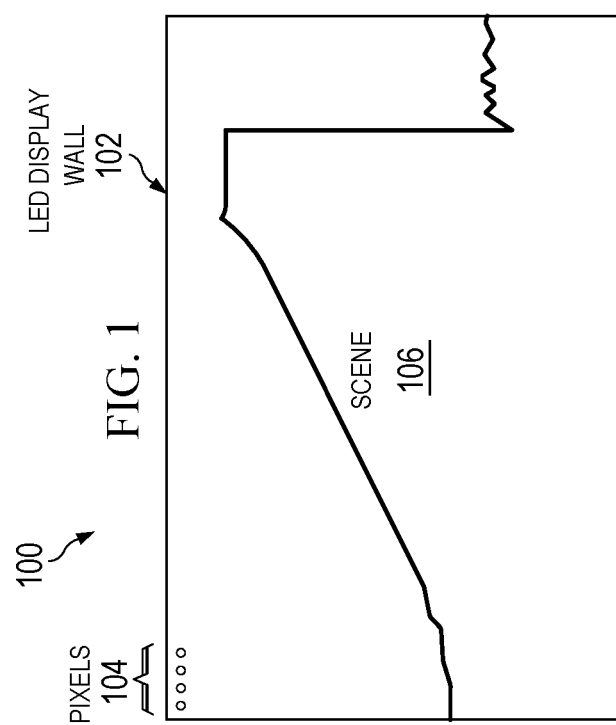
FIG. 1 illustrates an exemplary 2D display wall that includes pixels displaying a precursor image for use with a live action scene, in an embodiment.

FIG. 1 illustrates an exemplary 2D display wall that includes pixels displaying a precursor image for use with a live action scene, in an embodiment. Environment 100 of FIG. 1 includes a display wall 102 that may be located in a real-world environment where one or more live actors may engage with display wall 102 while acting, performing, and/or being captured by one or more cameras. In this regard, display wall 102 in environment 100 may display one or more precursor images while be recorded and captured by the camera(s) in a live action scene.

For example, display wall 102 may correspond to a liquid crystal display (LCD), a light-emitting diode (LED) display, plasma display, a combination thereof, or the like (including LCD LED, thin-film transistor (TFT) LCD, OLED, etc.). In this regard, display wall 102 may consist of and/or include pixels 104, which may be used to emit light of certain colors, intensities, and other parameters when outputting and displaying one or more images. Pixels 104 may be picture or image elements that may correspond to the smallest point or controllable element of display wall 102 that may make up imagery displayed on display wall 102. This may be used to display scene 106 from a renderer, which may correspond to computer-generated imagery, early captured or recorded live action scenes and/or objects, or a combination thereof. In order to display scene 106 on display wall 102 using pixels 104, a renderer and/or compositor may be used for image processing and output. Scene 106 may correspond to a precursor image that is displayed on display wall 102. A precursor image may be one or multiple individual images, which may be displayed in sequence, such as frames of an animation or video. The precursor image for scene 106 may therefore be provided by a renderer and/or may be processed using a compositor. The precursor image may also be associated with precursor metadata that may include computer-generated imagery metadata, such as the scene description for scene 106 that is used in rendering and outputting scene 106 on display wall 102 using pixels 104.

A renderer may correspond to hardware and/or software that generates one or more images, or data usable for representing those images, based on a scene description, which may be single images or frame of an animation or video. A compositor may correspond to hardware and/or software that may combine image data of a captured live action scene and a rendered scene to form composited imagery. The captured live action scene may be captured as image data, such as that of a live actor performed during recording, and live action metadata of the capturing of the scene, such as camera settings, camera positions, lighting conditions, visual effects, etc.

Display wall 102 may correspond to one or more structures that may be positioned in a live action scene and be capable of displaying imagery from a renderer, compositor, or the like. In some instances, display wall 102 may be a single, planar display and therefore provide a 2D output of scene 106. In other instances, display wall 102 may correspond to one of a plurality of planar or curved elements and/or display panels and/or may include multiple display panels in varying positions or orientations to generate a single wall for precursor imagery. Display wall 102 may correspond to an LED wall or other structure capable of displaying imagery. Display wall 102 may correspond to a background of a live action scene, but it is not necessary display wall 102 is a background and instead may be orientated and/or otherwise placed in a live action scene. Display wall metadata for display wall 102 may correspond to data that represents details of display wall 102, such as its construction, its orientation, resolution, size, etc., and its position in the live action scene. In some embodiments, this may be determined by one or more depth, distance, and/or ranging sensors, which may be used in combination with optical cameras and/or sensors for distance finding between real-world 3D objects and/or display wall 102 and one or more cameras.

FIG. 2 illustrates an exemplary live action scene having stereoscopic cameras capturing a live actor in a 3D environment with a 2D display wall, in an embodiment. A display wall 202 is shown in environment 200, where environment 200 may correspond to a live action scene with an actor 208 and stereoscopic cameras 210 that capture imagery within the live action scene. In this regard, display wall 202 may be used to display a precursor image having a scene 204 while actor 208 is present and/or performing in environment 200. Scene 204 may be used to provide imagery that allows actor 208 to perform and/or interact with the imagery, such as a character or creature that actor 208 may converse with and/or one or more stage elements that allows actor 208 to determine their placements or performance. Further, scene 204 may be output by pixels 206 that may have certain light, color, and/or intensity that allows for capture, projection in the live action scene, and/or reflection on actor 208.

When capturing the live action scene in environment 200 that includes display wall 202 and actor 208, stereoscopic cameras 210 may be used to capture stereoscopic image data of the live action scene. For example, a left camera 212a and a right camera 212b may correspond to two cameras of the set for stereoscopic cameras 210. Each of stereoscopic cameras 210 may be oriented and/or placed relative to display wall 202 and live actor 208 so that each of stereoscopic cameras 210 capture a different angle of the live action scene. Left camera 212a and right camera 212b may be oriented so that capture of the live action scene may appear more realistic and/or in 3D. For example, left camera 212a and right camera 212b may be placed to mimic vision or eyes of a character or creature or so that they otherwise would be similar to a viewer when viewing the live action scene. Thus, left camera 212a is oriented at a left camera angle 214a while right camera 212b is oriented at a right camera angle 214b.

However, and as noted above, different ones of pixels 206 may be captured around actor 208 by stereoscopic cameras 210. For example, a portion of pixels 206 around live actor 208 may be hidden or may be visible by each of left camera 212a and right camera 212b based on left camera angle 214a and right camera angle 214b, respectively. Further, differences in placements, capture angles, and/or orientations, as well as camera construction and/or use, may cause different image capture of pixel values on display wall 202. When left camera 212a is oriented at left camera angle 214a, pixels on a left side of actor 208 may be visible, such as those that may be behind live actor 208 when viewed directly straight forward. However, left camera angle 214a allows for viewing of certain ones of pixels 206 behind actor 208. In contrast, portions of pixels 206 on a right side of actor 208 may be hidden based on left camera angle 214a, which may normally be visible when viewing actor 208 and display wall 202 in a directly straight forward manner and/or angle.

In contrast, right camera 212b may capture different ones of pixels 206 when capturing image data of the live action scene having display wall 202 with actor 208 at right camera angle 214b. Thus, other ones of pixels 206 may be visible or hidden when viewed and/or captured at right camera angle 214b. Thus, when combining image data from each camera, the image data may be slightly different between each of stereoscopic cameras 210. In order to combine the image data and properly render and/or output stereoscopic image data in a more realistic and 3D manner, pixels constituting display wall may be adjusted, as discussed herein, to provide movements, warping, replacement pixels, and/or pixel values for adjusting one or more precursor images on display wall 202. Thus, stereoscopic image data captured by stereoscopic cameras may be adjusted using an image matte that distinguishes display wall 202 from actor 208. Adjustment of pixel data and values for scene 204 on display wall 202 may be performed as discussed in further detail with regard to FIGS. 3-6.

FIGS. 3 and 4 demonstrate different camera angles of a stereoscopic camera set, which may capture different background pixels of a display wall when capturing stereoscopic image data of a live action scene having the display wall with a live actor. In this regard, FIG. 3 illustrates an exemplary environment for a live action scene captured by a left oriented camera, in an embodiment. FIG. 4 illustrates an exemplary environment for a live action scene captured by a right oriented camera, in an embodiment. FIGS. 3 and 4 are discussed below when performing operations to generate and use an image matte identifying the live actor and the display wall for adjusting background pixels of the display wall for more realistic imagery on the display wall.

Environment 300 of FIG. 3 includes a display wall 302 and environment 400 of FIG. 4 includes a display wall 402. Display walls 302 and 402 may correspond to the same display wall, such as display wall 202 which is being captured by stereoscopic cameras 210. However, in other embodiments, display walls 302 and 402 may correspond to different display walls and/or a display wall displaying different precursor images, such as when cameras are moved and/or a camera is rotated to another position and/or angle with respect to a display wall. In this regard, an actor 304 in environment 300 and an actor 404 in environment 400 may be placed relative to display wall 302 and display wall 402, respectively, such as by being positioned in front of display walls 302 and 402 when performing in a live action scene. Display walls 302 and 402 may correspond to a generally planar or curved 2D surface that displays precursor imagery that may be output by a renderer for a live action scene. Actors 304 and 404 may correspond to 3D characters, but more generally other 3D creatures, objects, and the like may also be placed relative to display walls 302 and 402 in a live action scene that is captured by stereoscopic cameras.

In environment 300, a camera angle 306 captures image data of display wall 302 and actor 304 from a left angle, for example, as may be captured by left camera 212a from left camera angle 214a. Camera angle 306 may be angled and/or positioned relative to display wall 302 and actor 304 so that different pixels on display wall 302 are captured relative to the live scene captured in environment 400 of FIG. 4. For example, camera angle 306 captures left-side pixels 308a and 308b and right-side pixels 310a and 310b. If actor 304 and display wall are viewed in a straight line (e.g., where the camera or viewer is aligned along a straight line with a center of actor 304 to a center of display wall 302), certain pixels of display wall may be viewed and captured, while actor 304 may hide, obscure, or block other pixels that are directly behind actor 304.

However, those blocked pixels may be changed, which may be slight or may be significant, based on camera angle 306 when camera angle 306 is angled relative to actor 304 in front of display wall 302. For example, camera angle may be positioned and angled by a small amount relative to a straightforward direction (e.g. 5 or 10 degrees), or may be significantly angled (e.g., by 45 degrees). Left-side pixels 308a and 308b in environment 300 may therefore include pixels on display wall 302 that are not normally viewable behind actor 304 when viewed from a straightforward direction. However, right-side pixels 310a and 310b may be more hidden behind actor 304, and therefore additional background pixels on display wall 302 that are normally viewable behind actor 304 when viewed from a straightforward direction may now be blocked by actor 304 and hidden from view. Further, if camera angle is angled relatively upward or downward when capturing display wall 302 and actor 304, different pixels of display wall 302 may be captured that are behind actor 304 based on the corresponding angle.

In a similar manner, camera angle 406 in environment 400 captures image data of display wall 402 and actor 404 at an angle and/or position that causes different background pixels on display wall 402 to be captured. In contrast to environment 300, camera angle 406 is angled at a right-side angle relative to display wall 402 and actor 404, which may correspond to right camera 212b capturing image data from right camera angle 214b. In this regard, left-side pixels 410a and 410b may be more hidden behind actor 404 and therefore additional background pixels on display wall 402 that are normally viewable behind actor 404 when viewed from a straightforward direction may now be blocked by actor 404 and hidden from view. However, right-side pixels 408a and 408b may instead include pixels on display wall 402 that are not normally viewable behind actor 404 when viewed from a straightforward direction, but are now visible due to camera angle 406. Therefore, image data captured from each of camera angles 306 and 406 may each have different background pixels on display walls 302 and 402, respectively, such as those that may be around actors 304 and 404, respectively, based on corresponding camera angles.

Camera angles 306 and 406 may correspond to stereoscopic cameras that may capture stereoscopic image data that requires processing in order to properly coordinate and display precursor image(s) on display walls 302 and 402, such as when capturing a 2D precursor image that is displayed on a 2D wall while a 3D actor is further in a live action scene relative to the 2D wall. In this regard, in an exemplary operation to adjust and/or re-render background pixels on display walls 302 and/or 402 may be provided, either in real-time or near real-time as a precursor image for the background pixels are displayed or later during a post-processing operation with image data captured of display walls 302 and/or 402. For example, camera angles 306 and 406 capture different iterations of a precursor image on display walls 302 and 402, respectively, based on their corresponding angles. This may correspond to additionally captured pixels; however, this may also correspond to different pixel color values and other parameters caused by camera angles 306 and 406. In this regard, a precursor image may be attempting to display a 3D environment, character, and/or objects, but when displayed by display walls 302 and 402 and captured from different angles, may appear differently (e.g., due to different emitted light, captured pixels, and the like). Thus, the precursor image on display walls 302 and 402 may appear differently and pixel replacement may be required in order to synchronize and/or cause image data (including stereoscopic image data that may be adjusted for one or more other camera angles) to appear more realistic with a flat 2D precursor image displaying 3D stage elements and features for a live action scene.

For example, a live action scene in environments 300 and 400 may be captured by one or more cameras from camera angles 306 and 406, respectively, as well as using additional sensors (e.g., ranging and/or depth sensors). Display walls 302 and 402 may be present in the live action scene(s) and may be displaying wall imagery corresponding to one or more precursor images. Display walls 302 and 402 may fill the background or constitute a portion of the background and may be used to present a background scene, project light, and/or display imagery that may be projected on and/or reflected by 3D objects and/or actors (e.g., actors 304 and 404) in the live action scene(s). In some embodiments, the light emitted by the display wall may eliminate portions of the live action scene including actors 304 and/or 404).

An image processor may include operations, in real-time or at a later time, to capture and/or process the image data of the live action scene(s). The image data may correspond to stereoscopic image data, such as when environments 300 and 400 correspond to the same live action scene and camera angles 306 and 406 correspond to different angles of two or more stereoscopic cameras capturing the live action scene at the same time. However, this is not necessary and other image data may be captured and processed as discussed herein. The image processor may then determine an image matte that identifies the portions of the captured live action scene that correspond to the stage element (e.g., actor 304/404) and/or display wall 302/402. In some embodiments, the image matte may correspond to a binary image matte where pixels are identified as one of two values and/or identifiers, one for those belonging to display wall 302/402 and one for those belonging to actor 304/404. The image matte may also correspond to a junk matte having pixels assigned as display wall 302/402, actor 304/404, or undecided whether the pixels belong to display wall 302/402 or actor 304/404. An n-ary matte may also be used to assign pixel values that may be shared by display wall 302/402 and actor 304/404.

This allows the image matte to assign those pixels a particular pixel or color value and may be used to adjust, warp, or otherwise change those pixels belonging to display walls 302 and/or 402, as well as those pixels belonging to actor 304 and/or 404. The image matte may be determined by computing which pixels belong to display walls 302 and/or 402 and which belong to actor 304 and/or 404. Computations for pixel identification may be performed by comparing what was captured in the image data to the pixel values for the precursor metadata, as well as processing using display wall metadata for the display wall in the background (e.g., dimensions and/or properties of the display wall, distances and/or depths to the display wall and/or between stage elements and cameras, real-world data of the live action scene having the display wall, and the like). Those pixels matching with the precursor metadata and/or background wall metadata within a tolerance or range and/or being located in an expected location or vicinity in the image data may be considered background pixels of display walls 302 and/or 402. The image matte may also or instead be determined by utilizing ranging and/or depth from the cameras to display walls 302 and/or 402, as well as any other position or angle information for cameras and display walls 302 and/or 402, to determine those pixels of a shallower depth captured in the image data and those of an expected depth of display walls 302 and/or 402. Thereafter, foreground objects, such as actors 304 and/or 404 may be identified by the shallower pixels and display walls 302 and/or 402 may be identified by the pixels of the expected and/or deeper depth.

With stereoscopic image data, the image matte be used to identify those pixels that may be viewed from different cameras, which may be used to correct and/or replace background pixels for image data that would be a composite of multiple camera views. The composite imagery and/or view may be used to adjust the precursor image to be "stereo-displaced" in that that precursor image may appear as though it is part of the real-world live action scene. The image matte may correspond to a pixel array where each value in the pixel array indicates whether a corresponding pixel is part of the image data captured of one or more precursor images or other imagery presented on display wall 302/402 or whether the corresponding pixel is part of a foreground object, element, or person (e.g., actor 304/404). The image matte may then be used to process the image data of the live action scene and selectively modify pixels that correspond to display wall 302/402. When modifying the pixels, initial precursor metadata (e.g., metadata designated the pixel values and/or precursor image) of the precursor image may be used, as well as display wall metadata, live scene metadata, and/or depth or ranging data detected by one or more sensors for a depth from a camera to display wall 302/402.

For example, precursor metadata for a precursor image may include scene description information for a scene displayed on display wall 302/402. This may include pixel outputs or other pixel display data, however, more generally the precursor metadata may have data describing the 3D positioning and/or placement of objects, characters, or the like in the precursor metadata. Thus, the 3D position of an object may change when viewed on display wall 302/402 from different camera angles, and pixel adjustment, modification, and/or replacement may be required for image data captured from different angles, including stereoscopic image data captured from different cameras. The modification of the pixels that correspond to display wall 302/402 may include replacing pixel location, color, brightness, luminosity, or other data values of those pixels that were captured in image data with pixel color values that would have been captured if the stage elements and features from the precursor metadata actually existed in their corresponding positions in the live action scene. In some embodiments, this may allow stereoscopic cameras to capture stereoscopic image data of a pair of images (or frames of multiple images for a video) of actor 304/404 in front of display wall 302/402 and use the matte to remove display wall 302/402 from the live action scene in the image data. Thereafter, the image processor may replace background pixels for display wall 302/402 with a rendering of the precursor image as it would appear in 3D and/or as a part of the real-world environment for the live action scene.

Thus, the image matte allows for background adjustment and/or replacement of display wall pixels that specifically accounts for precursor metadata of the precursor image on the display wall. Further, the background pixel adjustment or replacement may utilize camera positions, camera angles, and/or pixel color values to determine replacement pixels and/or adjust the precursor image. In some embodiments, replacement of pixels for display wall 302/402 may correspond to adjusting or replacing captured pixels with stereo-displaced pixels. For example, an image processor may compute where the camera would be in the precursor scene for the precursor image based on a position and/or angle of the camera(s) and display wall 302/402. Thus, the background pixels may be generated using this information and the image matte may be used to replace the background pixels for display wall 302/402 with the stereo-displaced pixels. This may be done in real-time to adjust the precursor image on display wall 302/402 during capture of the live action scene, or during a later post-processing operation. Different replacement images may also be generated for different cameras of a stereoscopic camera set, such as hero or non-hero cameras. The distance, depth, and/or ranging information between the camera(s) and display wall 302/402 may be known from position data and/or measurements or may be determined by one or more depth sensors.

Pixel adjustments, changes, or warping may also be determined and used for adjusting pixels with the image matte in additional embodiments. Pixel adjustment may include moving the background pixels of the 2D display wall in one or more direction and/or warping the pixels so that the pixels are adjusted to one or more different locations within the image data. Adjusting pixels may also include changing data values of pixels (e.g., color, brightness, luminosity, effect, intensity, and/or the like) instead of or in addition to movement in order to provide different pixel outputs for the original background pixels of the display wall. For example, the background pixels may be adjusted using the image matte and the precursor metadata to provide higher resolution pixels than what was initially captured in image data. This may occur where the initial precursor image is quickly rendered and/or of low resolution, but later a higher resolution image may be desirable, or if stage, camera, and/or environmental effects and properties cause the display wall to be captured in a lower quality. For example, this may occur where camera distance, lens effect, focus, or the like causes the captured image data to have lower quality resolution of the precursor image. Thus, this adjustment by changing or warping pixels may occur in post-processing, but may also occur in real-time where an initial precursor image is of lower resolution in order to calibrate cameras and/or precursor metadata.

In some embodiments, the replacement of the background pixels may also be performed to provide a fast and/or real-time replacement of one quality, which may be done with the precursor metadata directly on display wall 302/402 or in real-time recorded and viewed image data, while another replacement may be done slower but higher quality at a later time. Additionally, some embodiments may allow the replacement of background pixels to add a visual or photographic effect in a display wall precursor image or a real-world captured image, such as blurring, color correction, fog or other additional environmental effects, and the like. This may not be applied to the captured light from the display wall but is instead applied to the precursor metadata so that it is applied to the scene description in the precursor metadata. This allows the effect to be rendered and substituted for the captured version of display wall 302/402 in the live action scene.

Figure 5:
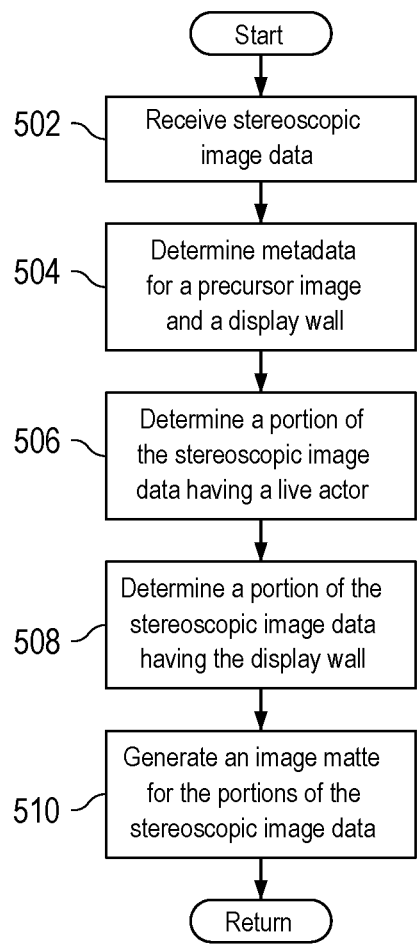
FIG. 5 is a flowchart of an exemplary method as might be performed by a computing system when generating an image matte for stereoscopic image data captured by stereoscopic cameras of a 3D object and a 2D display wall, in an embodiment.

FIG. 5 is a flowchart of an exemplary method as might be performed by a computing system when generating an image matte for stereoscopic image data captured by stereoscopic cameras of a 3D object and a 2D display wall, in an embodiment. Note that one or more steps, processes, and methods described herein of flowchart 500 may be omitted, performed in a different sequence, or combined as desired or appropriate.

In step 502 of flowchart 500, stereoscopic image data is received. The stereoscopic image data may correspond to image data captured by two or more cameras and include a live action scene where a live actor may be engaging in a performance in 3D. Further, the live action scene may include a display wall that may be generally planar or curved and may present a 2D precursor image that corresponds to a 3D scene, character, and/or object that is presented and/or projected in the live action scene via the display wall. In some embodiments, more generally other image data may be received, such as image data from one or more cameras that need not be stereoscopic image data. For example, other image data may include background display walls that may be similarly processed as discussed herein to determine an image matte and/or adjust pixels corresponding to the display walls using the image mat.

In step 504, metadata for a precursor image and the display wall is determined. The display wall may include pixels that correspond to the displayed precursor image, which may be displayed using precursor metadata from a renderer of the precursor image and display wall metadata for a geometry and other attributes of a display wall. The precursor metadata may include a scene description of the displayed scene for the display wall and therefore may include pixel display data for pixels displayed on the display wall. Additionally, captured image data further includes pixels, which may correspond to both the live actor and the display wall in the image data. In this regard, when referring to background pixels of the display wall, the background pixels may be replaced by replacement pixels on the display wall directly (e.g., while capturing the live action scene with the display wall) or may be replaced later in the image data during post-processing. In other embodiments, pixel values and/or data for the background pixels may instead be adjusted, warped, and/or changed based on desired changes to those background pixels on the display wall directly or in the corresponding image data. The display wall metadata may include geometry and aspects of the display wall needed for rendering the precursor image In step 506, a portion of the stereoscopic image data having a live actor is determined. In step 508, a portion of the stereoscopic image data having the display wall is determined. These may be two or more separate portions where pixel values are identified as corresponding to the live actor, the display wall, or one or more other elements and/or pixel identifiers. In some embodiments, steps 506 and/or 508 may occur in a different order or at the same time, such as when the portion of the stereoscopic image data belonging to the display wall is determined first or along with the portion belonging to the actor, respectively. In such embodiments, the display wall and/or precursor metadata may be used, at least in part, to identify the respective portions of the image data belonging to the live actor and the display wall. In other embodiments, different stage elements may also or instead be present in the stereoscopic image data, such as 3D objects, characters, or creatures different from a live actor.

When determining the portions in steps 506 and 508, one or more computations may be executed using the display wall and/or precursor metadata with the stereoscopic image data to identify the respective portions of the live actor and the display wall (and/or other objects and/or displays that may be in the live action scene and/or precursor images). Computation of the portions belonging to the live actor or the display wall may be performed by analyzing the display wall and/or precursor metadata to determine pixel values for the rendered precursor image and computing which pixel values in the captured image data match or are similar, within a similarity pixel value tolerance, similarity, or range, to those pixel values from the precursor metadata. Matching may be based on color values, brightness and/or luminosity, and/or relative location in the captured image data.

Further, a placement of the display wall relative to each camera capturing the image data may be used to determine foreground pixels of the live actor or other objects in the live action scene and background pixels of the display wall that are a known or measured distance, depth, or range from each camera. The distance of foreground pixels may be identified by those not matching the distance of the display wall from the cameras based on relative placements of the cameras and the display wall. In contrast, those that match the expected display wall distance may be designated as belonging to the display wall. Distance between the cameras and the display wall may be determined using one or more distance, depth, or ranging sensors and/or optical capture devices.

In step 510, an image matte for the portions of the stereoscopic image data is generated. The image matte may be generated using the two or more portions that identify the live actor, the display wall, another object or element, or have another identifier (e.g., a pixel value shared by the live actor and display wall or a pixel value that an image processor is unsure of whether the corresponding pixel belongs to the live actor or display wall). In some embodiments, the image matte may correspond to a binary image matte having one of two possible pixel values or identifiers for each of the live actor or the display wall. The image matte may therefore correspond to an alpha channel image that may allow for adjustments of portions of the stereoscopic image data.

In other embodiments, the image matte may correspond to a junk image matte or an n-ary image mat. With a junk image mat, pixels may be identified as those belonging to a particular object, character, or the like, such as the display wall or live actor, and those pixels that do not belong to this object. Further a categorization for the junk image matte may include those that are uncertain to belong to a specific group or pixel value. An n-ary image matte may also be used to identify pixel values that correspond to both the live actor and the display wall. The image matte may be stored as a pixel array and allow for modification of background pixels of the display wall.

Figure 6:
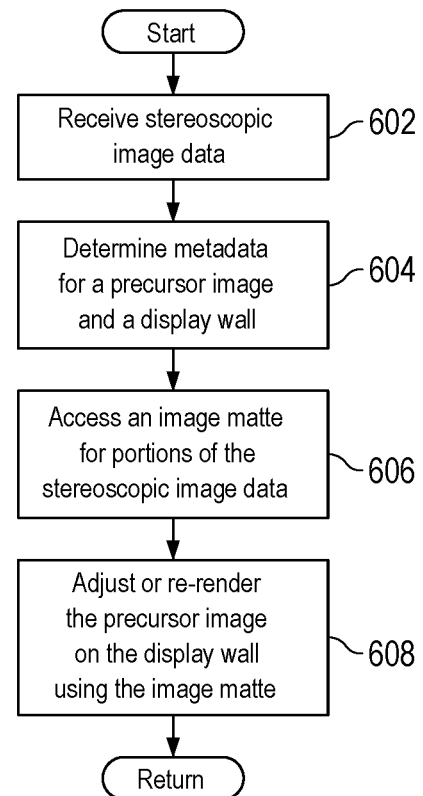
FIG. 6 is a flowchart of an exemplary method as might be performed by a computing system when rendering and/or adjusting pixels for use with image data of live action scenes having a 3D object and a 2D display wall, in an embodiment.

FIG. 6 is a flowchart of an exemplary method as might be performed by a computing system when rendering and/or adjusting pixels for use with image data of live action scenes having a 3D object and a 2D display wall, in an embodiment. Note that one or more steps, processes, and methods described herein of flowchart 600 may be omitted, performed in a different sequence, or combined as desired or appropriate.

In step 602 of flowchart 600, stereoscopic image data is received. The stereoscopic image data may correspond to the same or similar image data captured in step 502 of FIG. 5. However, in step 602, the stereoscopic image data is received after an image matte is determined and generated in order for the image matte to be applied to the image data and background pixels in the image data and/or on the display wall to be replaced, moved, warped, or otherwise changed. In this regard, the image data may include a live action scene captured by one or more cameras, such as two stereoscopic cameras when capturing a scene from different angles.

In step 604, metadata for a precursor image and a display wall is determined. As with step 504 of FIG. 5, precursor metadata may similarly correspond to data that may be used to render and/or output a precursor image on the display wall, which may include pixel display data for display wall pixels. Further, the precursor metadata may include a scene description for the precursor image and other information that may designate the output and/or visualization of the precursor image for the display wall and for the live action scene. Similarly, display wall metadata may be used to determine a geometry and/or placement of the display wall.

In step 606, the image matte for portions of the stereoscopic image data is accessed. The image matte may correspond to the one generated as the output of flowchart 500 from FIG. 5, such as the binary, junk, or n-ary image mat. In this regard, the image matte may be used to identify the pixels in the image data that correspond to the background pixels for the display wall, as well as foreground pixels, actor, object, or the like for foreground objects in the live action scene. Thus, the image matte may be used to specifically identify the pixel values for the display data so that the precursor image on the display wall may be re-rendered and/or adjusted for output for the display wall (e.g., in real-time when filming or capturing the live action scene and/or during post-processing). The image matte may also be used during real-time or post-processing of image data to adjust and/or re-render the precursor image in the captured image data and provide new background pixels in such image data. This may be performed to correct for camera-induced error or effects, resolution, and the like, provide a special image or real-world effect, or to adjust or replace with stereo-displaced pixels that may cause the precursor image to appear as a part of the 3D environment for the live action scene.

In step 608, the precursor image on the display wall is adjusted or re-rendered using the image mat. For example, when capturing stereoscopic or other image data from one or more cameras of a live action scene having a display wall with foreground actors or objects, different camera angles and/or placements may cause different capturing of the pixels, including different background pixels of the display wall that may be blocked or visible. Additionally, the background pixels' color, luminosity, or intensity, and the like may be different based on camera settings, scene lighting or effects in the 3D real-world environment, and the like. This may be caused by the placements or the angles of the cameras but may also be caused due to lighting in the live action scene, camera construction and/or engineering, camera lens, added or modified visual or special effects, actor lighting or costume, and other changes caused by elements of the display wall and/or live environment. This may include modifying properties, data or display values of pixels, and the like for different effects and visuals.

When adjusting or re-rendering the precursor image, the background pixels may be moved or warped in one or more sets of image data and/or replacement pixels may be generated for the display wall when capturing image data in real-time or capturing additional image data of the live action scene at a later time. The adjustments or replacement pixels may correspond to moving or warping the original display wall pixels in the background of the stereoscopic image data so that the image data has moved or warped pixels, or may include generating replacement pixels to change the background image, which may cause the background display wall pixels to appear different and/or stereoscopically adjusted. For example, when capturing the 2D display wall stereoscopically using two or more cameras, the different placements of the cameras and/or display wall may cause different background pixels of the display wall to be captured. Determination of the different pixels may be based on the precursor metadata, the display wall metadata, and/or the image matte.

Once differences between background pixels in different image data sets are determined, compensation may be provided for placements of background pixels, such as by moving or warping those pixels, so that the different image data sets may be joined or formed to be stereoscopic or other image effects may be created. For example, an average or other movement distance between different distances or placements between different background pixels in the different image data may bet determined and the background pixels for the display wall may be moved or warped in the image data. This may allow for a stereoscopic effect to be applied to the image data. Further, other movements or warps may be applied in order to provide different effects and/or cause the display wall to appear differently in the image data.

In various embodiments, the precursor image may not appear as rendered and designated by the precursor metadata. Thus, re-rendering the image may include determining the background pixels belonging to the display wall and generating replacement pixels and/or adjusting displayed/captured pixels to adjusted pixel values based on the image mat, the captured image data, background wall metadata, and/or the precursor metadata. The changes, warping properties, and/or adjustments may be generated to provide different colors and/or pixel values (e.g., brightness, intensity, luminosity, etc.), such as where the color or pixel values in the image data do not match the desired pixel values for the precursor metadata. The adjustments or replacement pixels may also be generated for the display wall when capturing the live action scene to provide better resolution of the precursor image and/or add or modify a visual or special effect in a precursor and/or real-world portion of images (e.g., pixels for an image or real-world effect. In further embodiments, the adjustments or replacement pixels may correspond to stereo-displaced pixels that may cause the precursor image on the display wall to appear as a 3D environment, character, creature, and/or object that is part of the live environment for the live actor in the live action scene. Additionally, the adjustments or replacement pixels may be generated for the image data so that in post-processing, background pixels in the image data may be adjusted and/or replaced. This may be done for the aforementioned effects and/or alterations of the precursor image, such as to provide different pixel values, provide better or different resolution, and/or add stereo-displaced pixels that cause the precursor image to appear in 3D as part of the live action scene's 3D environment.

Figure 7:
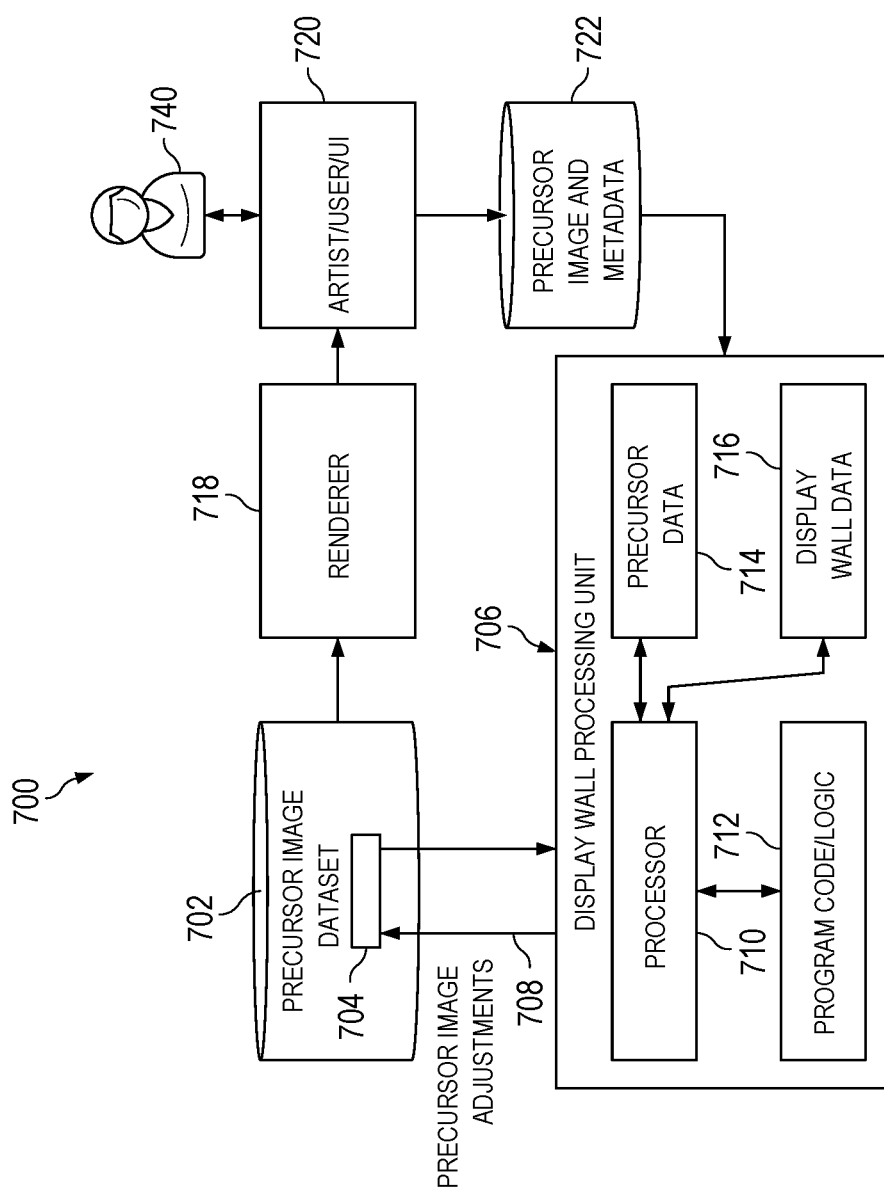
FIG. 7 illustrates a system for processing precursor images displayed on a 2D display wall during capture of a live action scene, in an embodiment.

FIG. 7 illustrates a system 700 for processing precursor images displayed on a 2D display wall during capture of a live action scene, in an embodiment. System 700 includes a precursor image dataset 702, a display wall processing unit 706, a renderer 718, a UI 720, and precursor image metadata 722.

A user 740 may interact with the UI 720 to define one or more precursor images for display on a display wall in a live action scene with one or more live actors or other real-world objects in the live action scene. A display wall may therefore correspond to a 2D image display and/or output component that is in a 3D scene. Precursor image metadata 722 may indicate, for example, the criteria for generation and/or display of one or more precursor images, which is further captured in the live action scene. Precursor image dataset 702 may store UI data used to present one or more precursor images that are input, adjusted, and/or generated via UI 720, which provides an improved UI for precursor image display. Precursor image dataset 702 may also include data and metadata used to render the precursor images. Precursor image dataset 702 may be loaded with data from a source of an animation and/or live captured scene, such as images, videos, and the like that is to be output on a display wall captured in a live action scene. Display wall processing unit 706 may utilize the methods and processes described herein to take precursor image metadata 722 and generate and/or display the precursor image(s) on the display wall. The display wall processing unit 706 may generate and/or adjust the precursor image during and/or after capture of the live action scene stereoscopically so that the precursor image may be adjusted, as described herein.

Display wall processing unit 706 includes a processor 710 that executes program code 712 to generate, adjust, and/or display one or more precursor images based on precursor image metadata 722, such as initial image data and metadata contained in precursor data 714. Display wall processing unit 706 may generate adjusted display wall data 716 from simplified UI inputs using UI 720, which may be the corresponding output of a precursor image on a display wall and/or in image data of the captured display wall. Display wall processing unit 706 may further store precursor image adjustments 708 to precursor image dataset 702 so that the corresponding data structures may later be used as guide feathers during groom generation. For example, display wall processing unit 706 may initiate the process by taking precursor image metadata 722 with initial precursor data 714 and generating a digital representation of a feather having adjusted display wall data 716. Display wall processing unit 706 may then output precursor image adjustments 708, which may be included with precursor image and metadata specifications 704 stored by precursor image dataset 702. Display wall processing unit 706 may then move to the next precursor image designated by user 740 and further generate and/or adjust precursor images. The resulting generated and/or adjusted precursor images may be rendered by renderer 718 and/or output to user 740 to inspect the results.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

As one skilled in the art will appreciate in light of this disclosure, certain embodiments may be capable of achieving certain advantages, including some or all of the following: (1) Techniques described and suggested in the present disclosure improve the field of computing, especially the field of digital animation, by improving the computation time and visualization of precursor images displayed on display walls. (2) Additionally, techniques described and suggested in the present disclosure improve the efficiency of computing systems by, since the computation time to calculate precursor image adjustments is reduced, to compute and render more complex and realistic models in digital animation and/or live action sequences. (3) Moreover, techniques described and suggested in the present disclosure are necessarily rooted in computer technology in order to overcome problems specifically arising with how to generate and/or adjust precursor images on display walls and/or in image data of captured display walls within the computational and time constraints of producing a digital animation product.

Figure 8:
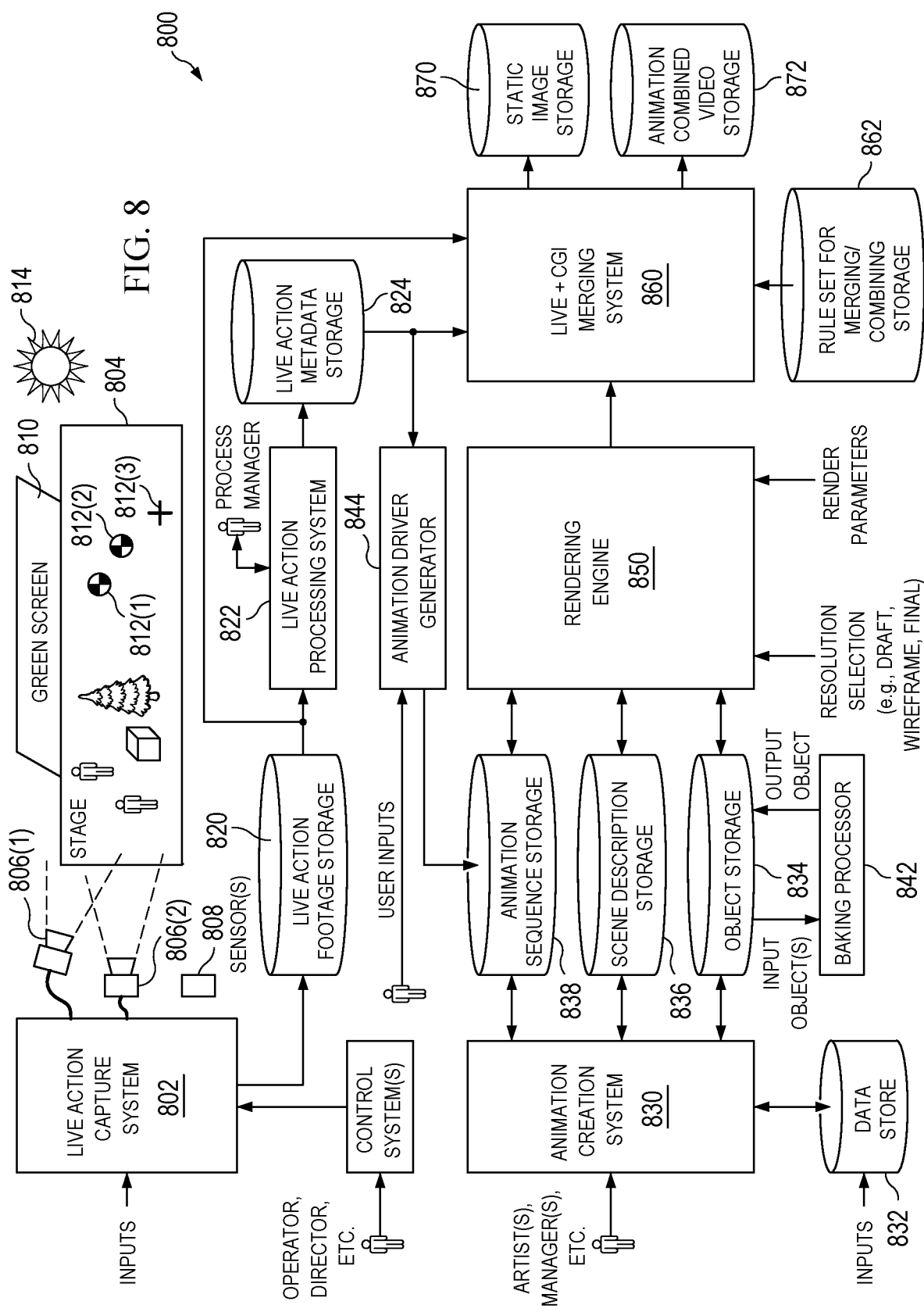
FIG. 8 illustrates an example visual content generation system as might be used to generate imagery in the form of still images and/or video sequences of images, according to various embodiments.

FIG. 8 illustrates an example visual content generation system 800 as might be used to generate imagery in the form of still images and/or video sequences of images. Visual content generation system 800 might generate imagery of live action scenes, computer generated scenes, or a combination thereof. In a practical system, users are provided with tools that allow them to specify, at high levels and low levels where necessary, what is to go into that imagery. For example, a user might be an animation artist and might use visual content generation system 800 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background stage elements that are computer-generated, all in order to tell a desired story or generate desired imagery.

Still images that are output by visual content generation system 800 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution Images might or might not be stored in a certain structured format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures, and a pixel value can be associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 8, a live action capture system 802 captures a live scene that plays out on a stage 804. Live action capture system 802 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 806(1) and 806(2) capture the scene, while in some systems, there might be other sensor(s) 808 that capture information from the live scene (e.g., infrared cameras, infrared sensors, motion capture ("mo-cap") detectors, etc.). On stage 804, there might be human actors, animal actors, inanimate objects, background objects, and possibly an object such as a green screen 810 that is designed to be captured in a live scene recording in such a way that it is easily overlaid with computer-generated imagery. Stage 804 might also contain objects that serve as fiducials, such as fiducials 812(1)-(3), that might be used post-capture to determine where an object was during capture. A live action scene might be illuminated by one or more lights, such as an overhead light 814.

During or following the capture of a live action scene, live action capture system 802 might output live action footage to a live action footage storage 820. A live action processing system 822 might process live action footage to generate data about that live action footage and store that data into a live action metadata storage 824. Live action processing system 822 might include computer processing capabilities, image processing capabilities, one or more processors, program code storage for storing program instructions executable by the one or more processors, as well as user input devices and user output devices, not all of which are shown. Live action processing system 822 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 814, as that might be useful in post-processing to match computer-generated lighting on objects that are computer-generated and overlaid on the live action footage. Live action processing system 822 might operate autonomously, perhaps based on predetermined program instructions, to generate and output the live action metadata upon receiving and inputting the live action footage. The live action footage can be camera-captured data as well as data from other sensors.

An animation creation system 830 is another part of visual content generation system 800. Animation creation system 830 might include computer processing capabilities, image processing capabilities, one or more processors, program code storage for storing program instructions executable by the one or more processors, as well as user input devices and user output devices, not all of which are shown. Animation creation system 830 might be used by animation artists, managers, and others to specify details, perhaps programmatically and/or interactively, of imagery to be generated. From user input and data from a database or other data source, indicated as a data store 832, animation creation system 830 might generate and output data representing objects (e.g., a horse, a human, a ball, a teapot, a cloud, a light source, a texture, etc.) to an object storage 834, generate and output data representing a scene into a scene description storage 836, and/or generate and output data representing animation sequences to an animation sequence storage 838.

Scene data might indicate locations of objects and other visual elements, values of their parameters, lighting, camera location, camera view plane, and other details that a rendering engine 850 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 830 might be interactive, allowing a user to read in animation sequences, scene descriptions, object details, etc. and edit those, possibly returning them to storage to update or replace existing data. As an example, an operator might read in objects from object storage into a baking processor 842 that would transform those objects into simpler forms and return those to object storage 834 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 832 might be used to drive object presentation. For example, if an artist is creating an animation of a spaceship passing over the surface of the Earth, instead of manually drawing or specifying a coastline, the artist might specify that animation creation system 830 is to read data from data store 832 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 844 might read in live action metadata, such as data representing movements and positions of body parts of a live actor during a live action scene Animation driver generator 844 might generate corresponding animation parameters to be stored in animation sequence storage 838 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 822. Animation driver generator 844 might convert that movement data into specifications of how joints of an articulated CGI character are to move over time.

A rendering engine 850 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 850 might include computer processing capabilities, image processing capabilities, one or more processors, program code storage for storing program instructions executable by the one or more processors, as well as user input devices and user output devices, not all of which are shown.

Visual content generation system 800 can also include a merging system 860 that merges live footage with animated content. The live footage might be obtained and input by reading from live action footage storage 820 to obtain live action footage, by reading from live action metadata storage 824 to obtain details such as presumed segmentation in captured images segmenting objects in a live action scene from their background (perhaps aided by the fact that green screen 810 was part of the live action scene), and by obtaining CGI imagery from rendering engine 850.

A merging system 860 might also read data from rulesets for merging/combining storage 862. A very simple example of a rule in a ruleset might be "obtain a full image including a two-dimensional pixel array from live footage, obtain a full image including a two-dimensional pixel array from rendering engine 850, and output an image where each pixel is a corresponding pixel from rendering engine 850 when the corresponding pixel in the live footage is a specific color of green, otherwise output a pixel value from the corresponding pixel in the live footage."

Merging system 860 might include computer processing capabilities, image processing capabilities, one or more processors, program code storage for storing program instructions executable by the one or more processors, as well as user input devices and user output devices, not all of which are shown. Merging system 860 might operate autonomously, following programming instructions, or might have a user interface or programmatic interface over which an operator can control a merging process. In some embodiments, an operator can specify parameter values to use in a merging process and/or might specify specific tweaks to be made to an output of merging system 860, such as modifying boundaries of segmented objects, inserting blurs to smooth out imperfections, or adding other effects. Based on its inputs, merging system 860 can output an image to be stored in a static image storage 870 and/or a sequence of images in the form of video to be stored in an animated/combined video storage 872.

Thus, as described, visual content generation system 800 can be used to generate video that combines live action with computer-generated animation using various components and tools, some of which are described in more detail herein. While visual content generation system 800 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

One embodiment might include a carrier medium carrying image data or other data having details generated using the methods described herein. The carrier medium can comprise any medium suitable for carrying the image data or other data, including a storage medium, e.g., solid-state memory, an optical disk or a magnetic disk, or a transient medium, e.g., a signal carrying the image data such as a signal transmitted over a network, a digital signal, a radio frequency signal, an acoustic signal, an optical signal or an electrical signal.

Figure 9:
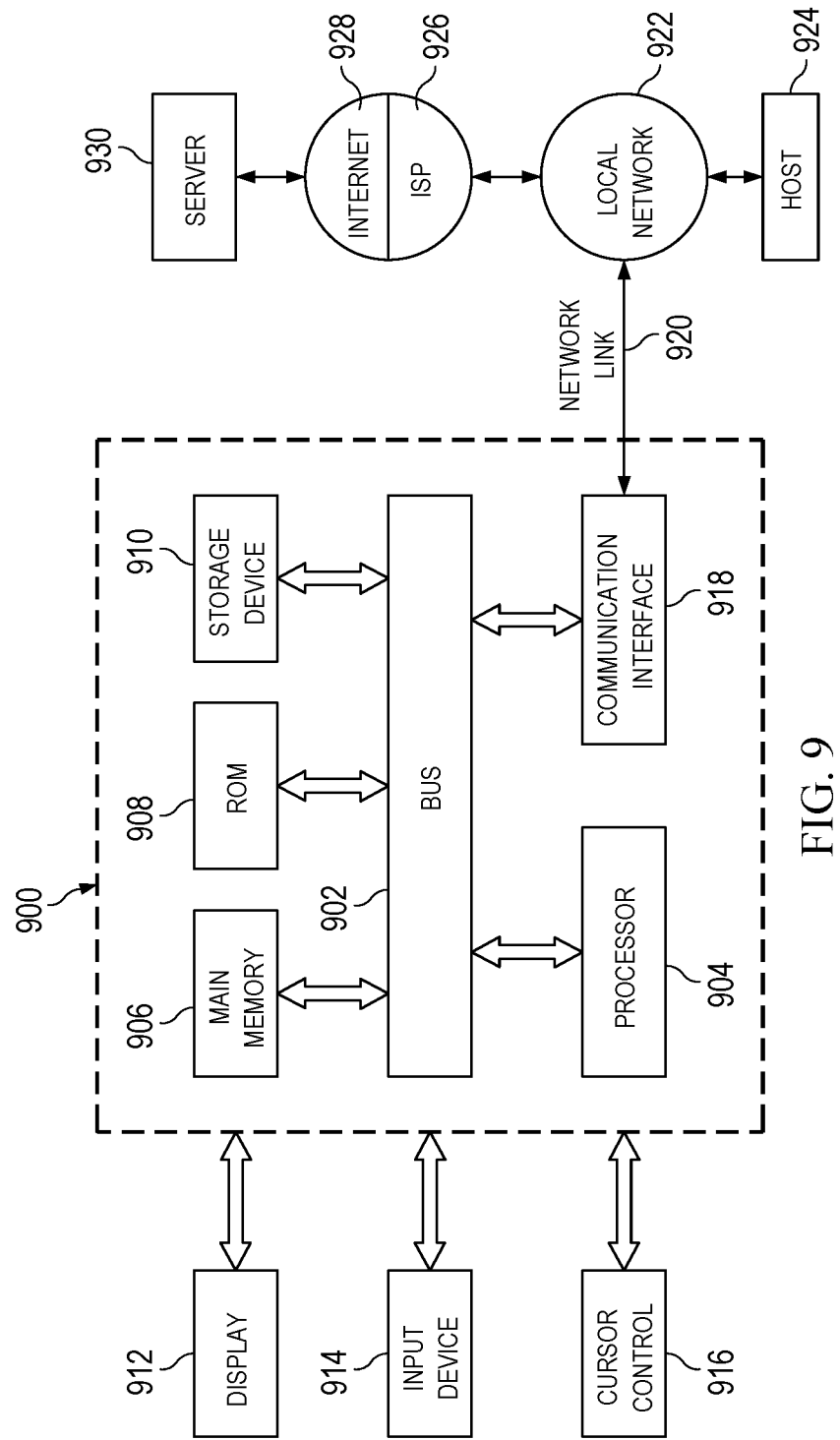
FIG. 9 is a block diagram illustrating an example computer system upon which computer systems of the systems illustrated in FIGS. 1 and 8 may be implemented.

FIG. 9 is a block diagram that illustrates a computer system 900 upon which the computer systems of the systems described herein and/or visual content generation system 800 (see FIG. 8) may be implemented. Computer system 900 includes a bus 902 or other communication mechanism for communicating information, and a processor 904 coupled with bus 902 for processing information. Processor 904 may be, for example, a general-purpose microprocessor.

Computer system 900 also includes a main memory 906, such as a random-access memory (RAM) or other dynamic storage device, coupled to bus 902 for storing information and instructions to be executed by processor 904. Main memory 906 may also be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a computer monitor, for displaying information to a computer user. An input device 914, including alphanumeric and other keys, is coupled to bus 902 for communicating information and command selections to processor 904. Another type of user input device is a cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a network connection. A modem or network interface local to computer system 900 can receive the data. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be a network card, a modem, a cable modem, or a satellite modem to provide a data communication connection to a corresponding type of telephone line or communications line. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world-wide packet data communication network now commonly referred to as the "Internet" 928. Local network 922 and Internet 928 both use electrical, electromagnetic, or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920, and communication interface 918. In the Internet example, a server 930 might transmit a requested code for an application program through the Internet 928, ISP 926, local network 922, and communication interface 918. The received code may be executed by processor 904 as it is received, and/or stored in storage device 910, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for processing, in an image processing system, a captured scene captured of a live action scene while a display wall is positioned to be part of the live action scene, wherein the display wall comprises one or more structures capable of displaying imagery, the method comprising:
   receiving image data of the live action scene having a live actor and the display wall displaying a first rendering of a precursor image, wherein the image data is captured by at least one camera in at least one placement relative to the live actor and the display wall;
   determining precursor metadata for the precursor image displayed on the display wall and display wall metadata for the display wall, wherein the precursor metadata comprises pixel display data for display wall pixels of the display wall, and wherein the display wall metadata comprises geometry data for a display wall position relative to the at least one camera;
   accessing an image matte for the image data, wherein the image matte indicates a first portion associated with the live actor and a second portion associated with the precursor image on the display wall in the live action scene;
   determining pixel display values for a replacement wall image of a higher resolution than the precursor image, wherein the pixel display values comprise a frequency adjustment to background pixels of the display wall in the image data; and
   adjusting the image data of the captured scene using the pixel display values and the image matte, wherein adjusting the image data warps the background pixels to the replacement wall image in the image data.

2. The computer-implemented method of claim 1, further comprising:
   before determining the pixel display values, determining, based on at least one of the precursor metadata, the display wall metadata, or the image matte, adjustments to the background pixels of the precursor image to the higher resolution based on one or more differences between captured pixels of the precursor image and the pixel display data in the precursor metadata.

3. The computer-implemented method of claim 2, wherein the adjustments are further based on one or more depths between the at least one camera capturing the live action scene and the display wall.

4. The computer-implemented method of claim 2, wherein the one or more differences between captured pixels and the pixel display data comprise a color difference between a captured color of the captured pixels and a rendered color for the pixel display data.

5. The computer-implemented method of claim 1, wherein determining the pixel display values is based on the image data and at least one of the precursor metadata, the display wall metadata, or the image matte.

6. The computer-implemented method of claim 1, wherein, before accessing the image matte, the method further comprises:
   determining the first portion associated with the live actor and the second portion associated with the precursor image in the image data based on one or more of the precursor metadata, depths between the at least one camera and the display wall, or color values for pixels in the image data; and
   generating the image matte for the image data having the first portion and the second portion based at least on the image data and the precursor metadata.

7. The computer-implemented method of claim 1, wherein adjusting the image data is performed in real-time or near real-time while capturing the live action scene to adjust the precursor image on the display wall in the image data to the replacement wall image having the higher resolution.

8. The computer-implemented method of claim 1, wherein adjusting the image data is performed at a time after capturing the live action scene to adjust the precursor image on the display wall in the image data to the replacement wall image having the higher resolution.

9. The computer-implemented method of claim 1, where the replacement wall image having the higher resolution is based on one or more changes caused by capturing the first rendering of the display wall using the at least one camera.

10. The computer-implemented method of claim 1, wherein the at least one camera comprises two cameras stereoscopically oriented in at least two placements and relative to each other when capturing the live action scene, wherein the image data comprises stereoscopic image data, and wherein determining the pixel display values uses the stereoscopic image data.

11. The computer-implemented method of claim 1, wherein the precursor image on the display wall comprises a computer animated background scene having at least one of light projected on the live actor or one or more computer animated objects for interaction with the live actor.

12. A system comprising: at least one processor, and a storage medium storing instructions, which when executed by the at least one processor, cause the system to implement the computer-implemented method of claim 1.

13. A non-transitory computer-readable storage medium storing instructions, which when executed by at least one processor of a computer system, causes the computer system to carry out the computer-implemented method of claim 1.

14. A non-transitory computer-readable medium carrying instructions, which when executed by at least one processor of a computer system, causes the computer system to carry out the computer-implemented method of claim 1.

15. A non-transitory carrier medium carrying data that includes information generated according to the computer-implemented method of claim 1.

16. A computer system for processing, in an image processing system, a captured scene captured of a live action scene while a display wall is positioned to be part of the live action scene, wherein the display wall comprises one or more structures capable of displaying imagery, the computer system comprising:
   at least one processor; and
   a computer-readable medium storing instructions, which when executed by the at least one processor, causes the computer system to perform operations comprising:
      receiving image data of the live action scene having a live actor and the display wall displaying a first rendering of a precursor image, wherein the image data is captured by at least one camera in at least one placement relative to the live actor and the display wall;

determining precursor metadata for the precursor image displayed on the display wall and display wall metadata for the display wall, wherein the precursor metadata comprises pixel display data for display wall pixels of the display wall, and wherein the display wall metadata comprises geometry data for a display wall position relative to the at least one camera;

accessing an image matte for the image data, wherein the image matte indicates a first portion associated with the live actor and a second portion associated with the precursor image on the display wall in the live action scene;

determining pixel display values for a replacement wall image of a higher resolution than the precursor image, wherein the pixel display values comprise a frequency adjustment to background pixels of the display wall in the image data; and adjusting the image data of the captured scene using the pixel display values and the image matte, wherein adjusting the image data warps the background pixels to the replacement wall image in the image data.

17. The computer system of claim 16, wherein determining the pixel display values is based on the image data and at least one of the precursor metadata, the display wall metadata, or the image matte.

18. The computer system of claim 16, wherein the operations further comprise:
before determining the pixel display values, determining, based on at least one of the precursor metadata, the display wall metadata, or the image matte, adjustments to the background pixels of the precursor image to the higher resolution based on one or more differences between captured pixels of the precursor image and the pixel display data in the precursor metadata.

19. The computer system of claim 18, wherein the adjustments are further based on one or more depths between the at least one camera capturing the live action scene and the display wall.

20. The computer system of claim 18, wherein the one or more differences between captured pixels and the pixel display data comprise a color difference between a captured color of the captured pixels and a rendered color for the pixel display data.

* * * * *